United States Patent
Koshikawa (10) Patent No.: US 10,626,645 B2
(45) Date of Patent: Apr. 21, 2020

(54) HINGE DEVICE

(71) Applicant: Sugatsune Kogyo Co., Ltd., Tokyo (JP)

(72) Inventor: Shinichirou Koshikawa, Tokyo (JP)

(73) Assignee: SUGATSUNE KOGYO CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/317,743

(22) PCT Filed: Jun. 28, 2017

(86) PCT No.: PCT/JP2017/023733
§ 371 (c)(1),
(2) Date: Mar. 8, 2019

(87) PCT Pub. No.: WO2018/012291
PCT Pub. Date: Jan. 18, 2018

(65) Prior Publication Data
US 2019/0330894 A1 Oct. 31, 2019

(30) Foreign Application Priority Data
Jul. 14, 2016 (JP) .................. 2016-139595

(51) Int. Cl.
*E05D 7/04* (2006.01)
*E05D 3/14* (2006.01)

(52) U.S. Cl.
CPC .............. *E05D 7/0415* (2013.01); *E05D 3/14* (2013.01); *E05D 7/0407* (2013.01); *E05D 2007/0492* (2013.01); *E05Y 2900/20* (2013.01)

(58) Field of Classification Search
CPC ............ Y10T 16/5321; Y10T 16/5322; Y10T 16/53225; Y10T 16/53253;
(Continued)

(56) References Cited

U.S. PATENT DOCUMENTS

| 5,206,974 A | 5/1993 | Lautenschlager |
| 6,032,333 A * | 3/2000 | Brustle ................. E05D 7/0407 16/240 |

(Continued)

FOREIGN PATENT DOCUMENTS

| JP | S62-500601 A | 3/1987 |
| JP | H06-50049 A | 2/1994 |

(Continued)

OTHER PUBLICATIONS

ISA/JPO, International Search Report dated Aug. 22, 2017 in International Application No. PCT/JP2017/023733, total 4 pages with English translation.

*Primary Examiner* — Chuck Y Mah
(74) *Attorney, Agent, or Firm* — Masuvalley & Partners (57) ABSTRACT

In a position adjustment mechanism of a hinge device, operability of an adjustment screw is assured, and rickety movement is prevented while enhancing load bearing property. An adjustment screw 40 of a hinge device 3 is screwed to a body member 10. A locked part 34 of the intervention member 30 is sandwiched between a pair of sandwiching faces 44a of the adjustment screw 40 each other. To both lateral faces of the locked part 34, a contact part 35e having a ridge shape and a clearance part 35b continuous to a lateral side of a contact part 35e for avoiding contact with a sandwiching face 44a are each formed.

14 Claims, 9 Drawing Sheets

(58) Field of Classification Search
CPC ... Y10T 16/53257; E05D 7/04; E05D 7/0423; E05D 7/0415; E05D 7/043; E05D 7/0407; E05D 2007/0438; E05D 2007/0446; E05D 2007/0453; E05D 2007/0461; E05D 2007/0476; E05D 2007/0484; E05D 2007/0492; E05D 3/14; E05Y 2900/20

See application file for complete search history.

(56) References Cited

U.S. PATENT DOCUMENTS

| | | | | |
|---|---|---|---|---|
| 6,266,848 B1* | 7/2001 | Fraccaro | ............... | E05D 7/0407 16/241 |
| 6,339,864 B1* | 1/2002 | Albrecht | ................ | E05D 7/125 16/246 |
| 6,418,589 B1* | 7/2002 | Salice | ................ | E05D 5/0276 16/258 |
| 6,757,939 B2* | 7/2004 | Mueller | ............... | E05D 7/0407 16/236 |
| 7,096,535 B2* | 8/2006 | Lin | ................... | E05D 11/1021 16/286 |
| 2003/0061682 A1* | 4/2003 | Muelller | ............... | E05D 7/0407 16/238 |
| 2005/0015927 A1* | 1/2005 | Kropf | ................... | E05D 3/142 16/286 |
| 2011/0083299 A1* | 4/2011 | Krudener | ............. | E05D 7/0407 16/319 |
| 2013/0239363 A1* | 9/2013 | apur | ....................... | E05F 5/006 16/50 |
| 2015/0337577 A1* | 11/2015 | Peer | ........................ | E05D 3/02 312/326 |
| 2016/0040466 A1* | 2/2016 | Cooper | .................... | E05D 3/16 16/50 |
| 2017/0138106 A1* | 5/2017 | Stuke | ................... | E05F 1/1008 |
| 2017/0350179 A1* | 12/2017 | Salice | ...................... | E05F 3/20 |

FOREIGN PATENT DOCUMENTS

| | | |
|---|---|---|
| JP | 3156516 U | 1/2010 |
| WO | 2012/057249 A1 | 5/2012 |

* cited by examiner

HINGE DEVICE

RELATED APPLICATIONS

This application is the U.S. National Phase of and claims priority to International Patent Application No. PCT/JP2017/023733, International Filing Date Jun. 28, 2017; which claims benefit of Japanese Patent Application No. 2016-139595 filed Jul. 14, 2016; both of which are incorporated herein by reference in their entireties.

FIELD OF INVENTION

The present invention relates to a hinge device for attaching a first member such as, for example, a furniture body or a wall of building to a second member such as a door, and particularly relates to a hinge device having an adjustment mechanism for slidably adjusting a position of second member relative to the first member.

BACKGROUND ART

For example, hinge devices described in Patent Literatures 1, 2 connect a first body part at the furniture body side (first member) with a second body part at a door side (second member) through a rotatable connection part. The first body part includes a body member continuous to a rotatable connection part and an intervention member intervened between the furniture body and the first body part. The intervention member is fixed to the furniture body. The adjustment screw is locked to the body member and screwed into the intervention member. By the adjustment screw, the body member is displaced relatively to the intervention member. That is to say, a position of the second member to the first member may be adjusted. A locking part to the body member of the adjustment screw includes a neck part passing through the body member and a pair of sandwiching faces disposed at both ends of the neck part so as to sandwich the body member.

Sandwiching faces of Patent Literature 1 are formed as parallel plane face.

Sandwiching faces of Patent Literature 2 are formed as tapered faces that reduce their diameters to the neck part.

PRIOR ART LITERATURE

Patent Literature 1: Japanese Utility Model No. 61-5970
Patent Literature 2: Japanese Patent Publication (Laid-Open) No. Heisei 10-37572

SUMMARY OF INVENTION

Problem to be Solved by Invention

In a hinge device of Patent Literature 1, spacing of a pair of sandwiching faces each other is wider than the thickness of body member. Thus, the body member tends to make rickety movement where the body member is positioned parallel to the intervention member.

In the hinge device of Patent Literature 2, a rickety movement may be prevented by sandwiching the body member by the pair of tapered sandwiching faces. Furthermore, operability may be improved due to low resistance upon rotating the adjustment screw.

However, the tapered sandwiching faces and the body member make almost point contacts such that a load bearing property is low.

The present invention considers the above problem and aims, in a position adjustment mechanism of a hinge device, to assure operability of an adjustment screw and to reduce a rickety movement as well as enhancing the load bearing property.

Means for Solving Problem

To solve the above problems, the present invention characterized in that; a hinge device connecting rotatably a first body part at a first member side and a second body part at a second member side through a rotatable connection part, the first body part comprises:

a body member continuous to the rotatable connection part;

an intervention member intervened between the first member and the body member while connected rotatably about a connection axis relatively to the body member; and an adjustment screw relatively displacing the body member and the intervention member to a direction orthogonal to the connection axis by screwed into one member of the body member or the intervention member while locked to another member;

wherein, the adjustment screw includes a neck part passing through another member and a pair of sandwiching faces disposed so as to face oppositely each other at both ends of the neck part; and wherein another member comprises a locked part sandwiched between the pair of sandwiching faces each other, to both lateral faces of the locked part, a contact part having a ridge shape contacted with a sandwiching face facing oppositely while each extending parallel to the connection axis and a clearance part avoiding contact with the facing sandwiching face while continuing to a lateral side of the contact part in a direction connecting the connection axis and the adjustment screw.

Thereby, the sandwiching faces and the contact part having the ridge shape are brought into almost linear contacts. Thus, the load bearing property may be enhanced than the point contacts (Patent literature 2). Furthermore, the resistance upon rotating the adjustment screw may be low with the clearance part such that operability may be assured. Furthermore, the rickety movement may be prevented by contacting the pair of contact parts with the corresponding sandwiching faces each other.

It is preferred that the clearance part forms an inclined face slanting toward another contact part side when going far from a corresponding contact part to a direction connecting the connection axis and the adjustment screw.

Thereby, contact between the clearance part and the sandwiching faces may be avoided certainly.

It is preferred that a ridge part is formed at both lateral face of the locked part and a ridge top face of the ridge part configures the inclined face and a first edge part of the ridge top face configures the contact part.

By thickening the locked part with the ridge, the load bearing property may be further enhanced.

It is preferred that a thickness of the locked part is decreased when going far from the contact part to a direction connecting the connection axis and the adjustment screw.

Thereby, contact between the part other than the contact part of the locked part (clearance part) and the sandwiching faces are certainly avoided. Furthermore, by thickening a part contacting with the sandwiching faces, the load bearing property may be enhanced.

It is preferred that a contact part facing to one sandwiching face and a contact part facing to another sandwiching face are apart along to a direction connecting the connection axis and the adjustment screw.

Thereby, another member may be securely locked by the adjustment screw.

It is preferred that the locked part comprises a pair of locked plate part that faces opposite with spacing along to a direction parallel to the connection axis and the neck part is passed therebetween, and the contact part and the clearance part are formed at both lateral faces of each locked plate part.

It is preferred that the sandwiching face has a planer shape orthogonal to a screw axis line of the adjustment screw.

Advantageous Effect of Invention

According to the present invention, in a position adjustment mechanism of a hinge device, operability of an adjustment screw can be assured, a rickety movement can be reduced, and a load bearing property can be enhanced.

BRIEF DESCRIPTION OF DRAWINGS

FIG. 10 shown a second embodiment of the present invention and FIG. 10(a) shows a cross-sectional view likely to FIG. 8 along with a line Xa-Xa in the same figure (b). FIG. 10(b) shows a cross-sectional view along with a line Xb-Xb in FIG. 10(a).

EMBODIMENT FOR PRACTICING INVENTION

Hereunder, the present invention will be described according to one embodiment of the present invention.

Figure 1:
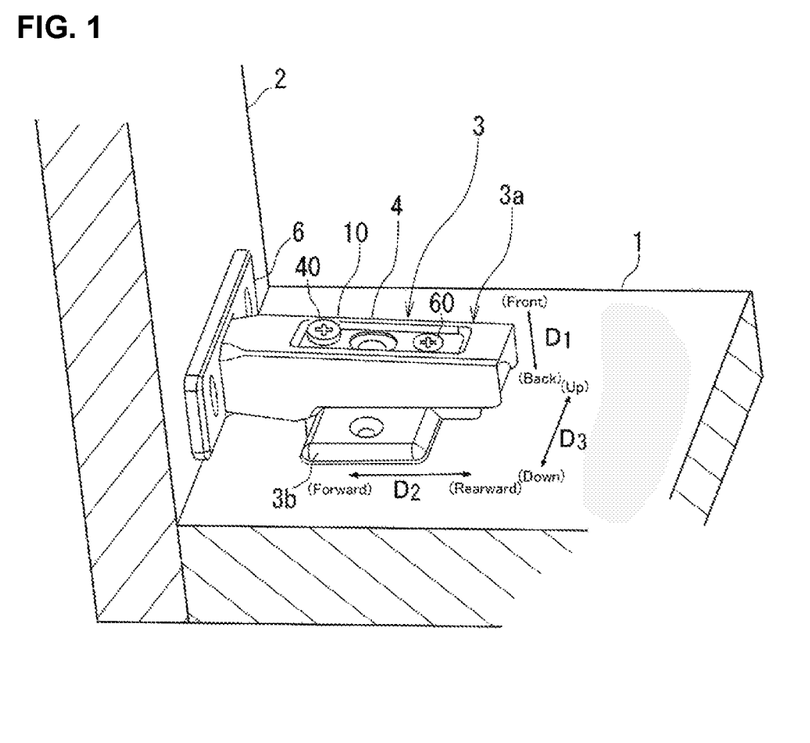
FIG. 1 shows a perspective view of a door apparatus in a closed state including a hinge device of one embodiment of the present invention.
Figure 2:
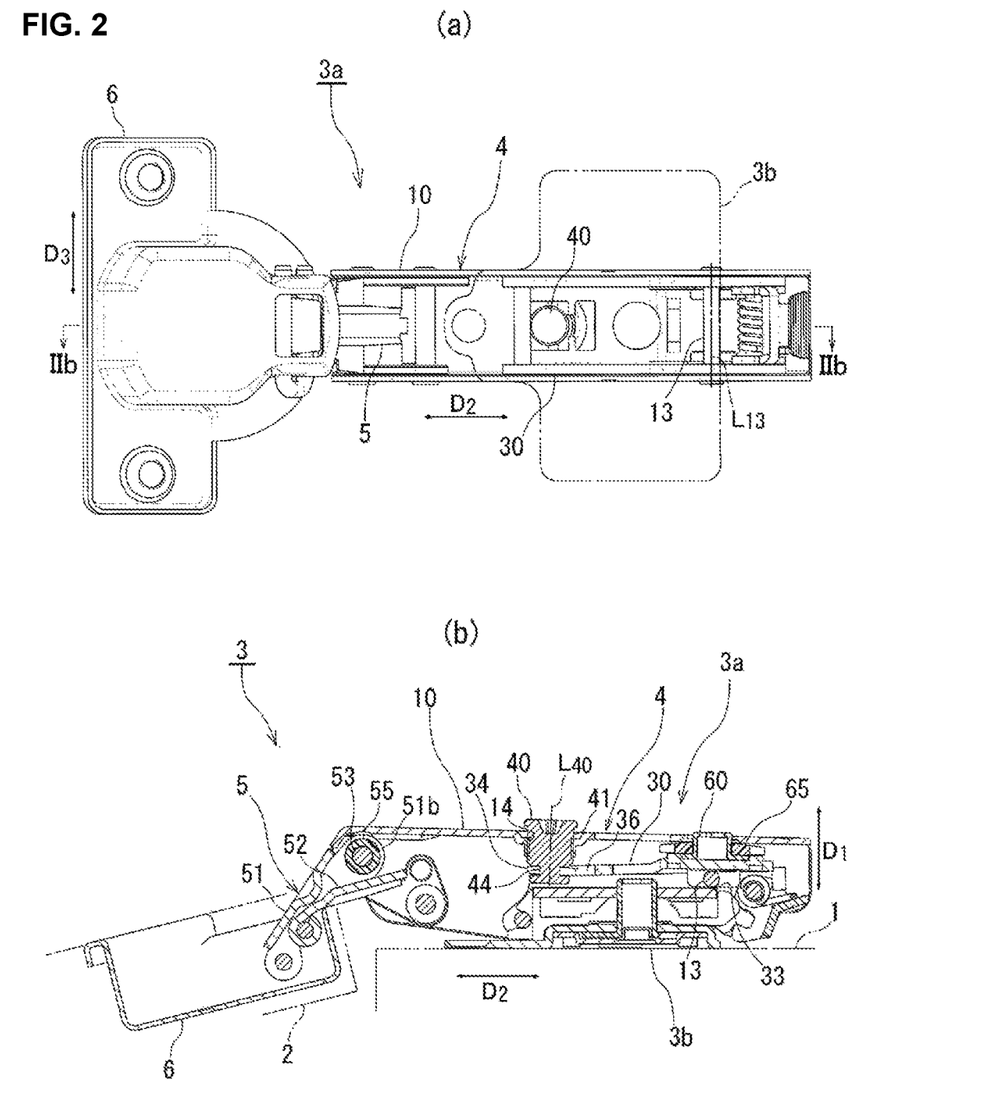
FIG. 2(a) shows a rear view of a hinge body of the hinge device in an opened state.
FIG. 2(b) shows a cross-sectional view of the hinge device along with a line II-b-IIb in FIG. 2(a).
Figure 3:
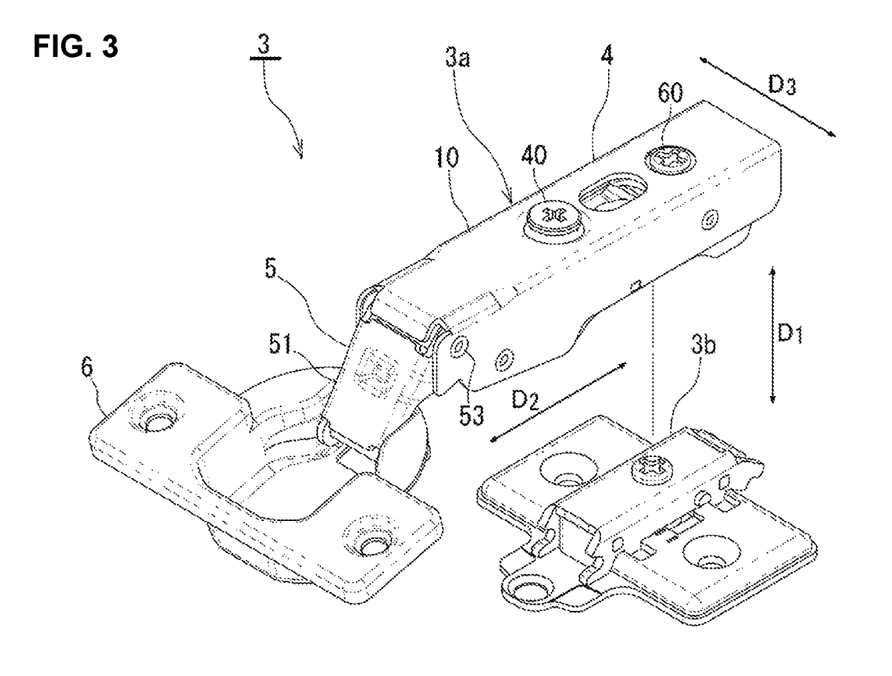
FIG. 3 shows a perspective view of the hinge device with exploding a hinge body and a metal seat.

As illustrated in FIG. 1, for example, a case body 1 (first member) such as a furniture and a door 2 (second member) are connected rotatably through a hinge device 3. As shown in FIG. 1-FIG. 3, the hinge device 3 comprises a hinge body 3a and a metal seat 3b. The metal seat 3b is attached to the case body 1. The hinge body 3a comprises a first body part 4 at the case body 1 side and a second body part 6 at the door 2 side. The first body part 4 is mounted such that the first body part 4 overlaps over the metal seat 3b. The second body part 6 is attached to the door 2. The first body part 4 and the second body part 6 are connected rotatably about a third direction $D_3$ (up-and-down direction) through the rotatable connection part 5.

Figure 4:
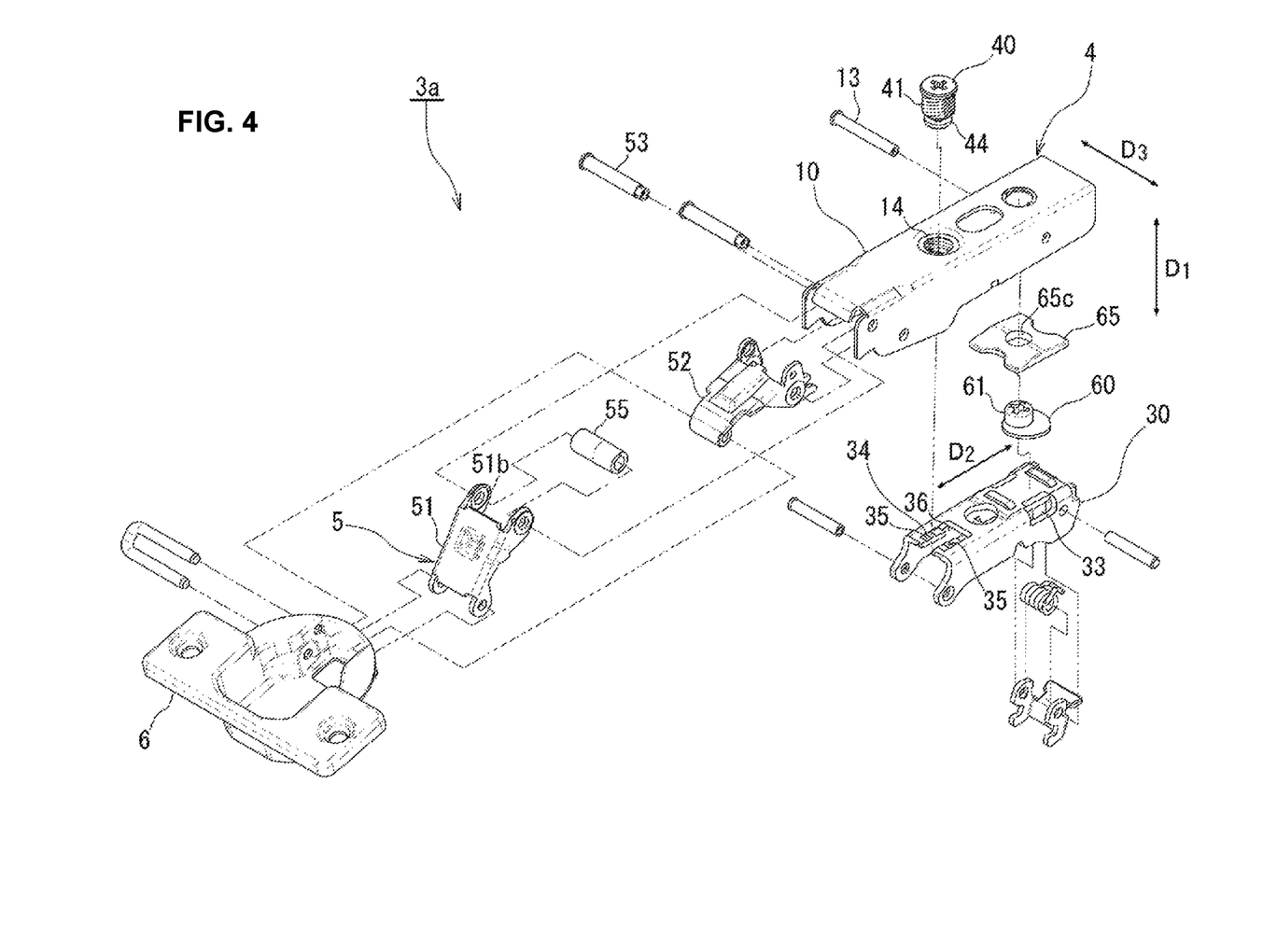
FIG. 4 shows an exploded perspective view of the hinge body.

As shown in FIG. 2(b) and FIG. 4, the rotatable connection part 5 includes a first arm 51 and a second arm 52. The arms 51,52, a body member 10 detailed later, and a second body part 6 configures a four-joint link. A rotatable connection pin 53 connecting the first arm 51 and the body member 10 detailed later is press-fitted into a rickety protection pipe 55. Both end faces of the rickety protection pipe 55 are abutted to a bearing part 51b of the first arm 51. Thereby, the rickety movement of the first arm 51 as well as the door 2 along to the third direction $D_3$ is prevented.

Now, by disposing a catching mechanism to the rotatable connection part 5, the door 2 may be urged to, for example, a closed direction. In such case, the catching mechanism prevents the rickety movement to the third direction $D_3$ such that the rickety protection pipe 55 may be omitted.

Figure 5:
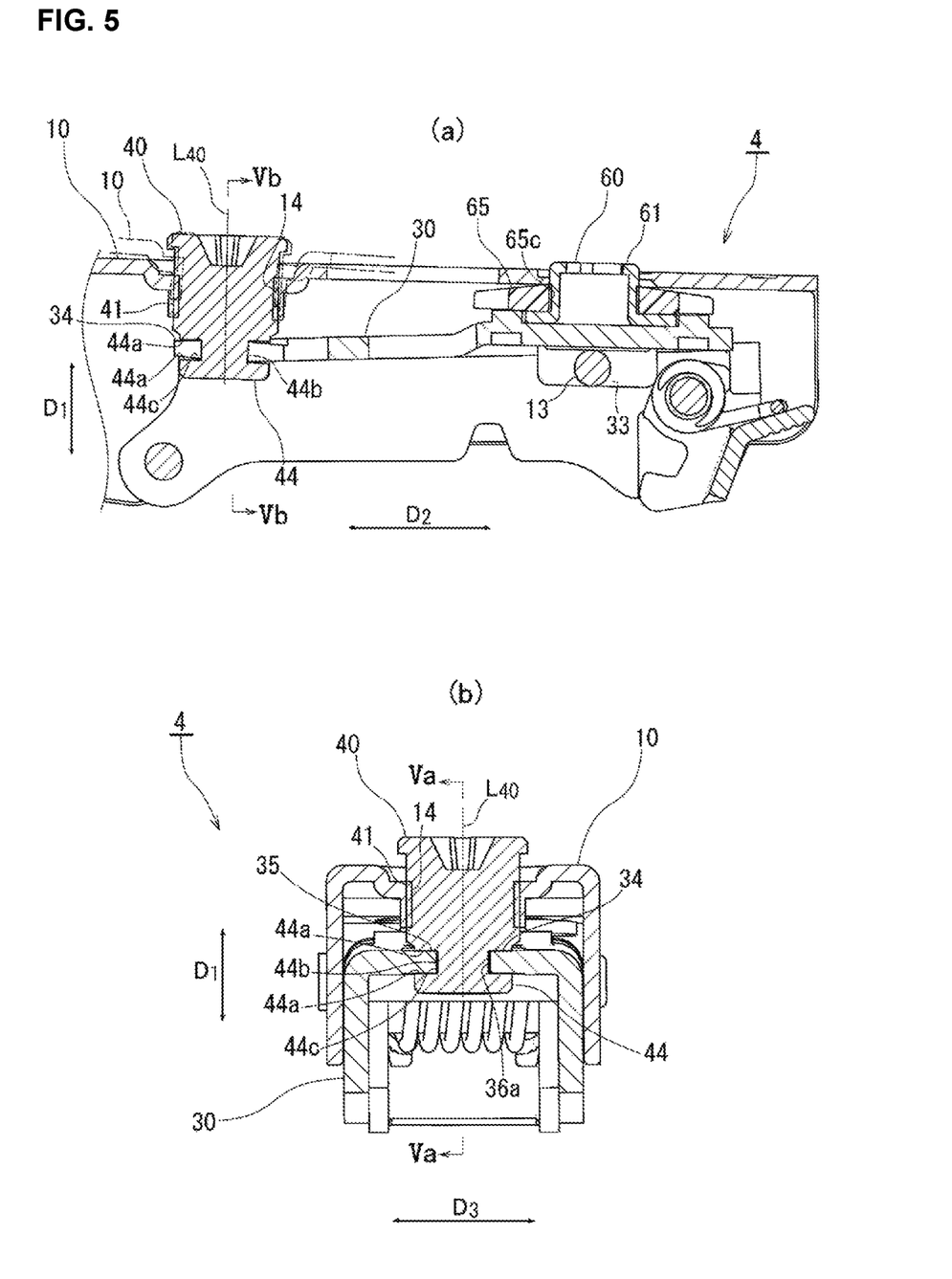
FIG. 5(a) shows a cross-sectional view illustrating the hinge body along with a line Va-Va in FIG. 5(b).
FIG. 5(b) shown a cross-sectional view of the hinge body along with a line Vb-Vb of FIG. 5(a).

As shown in FIG. 4 and FIG. 5, the first body part 4 includes a body member 10, an intervention member 30 and an adjustment screw 40. The body member 10 is formed in a U-shaped cross-section and extends to a second direction $D_2$ (forward-and-backward direction) orthogonal to the third direction $D_3$. As shown in FIG. 2(b), to a front-end part along to the second direction $D_2$ of the body member 10 (left side in FIG. 2(b)), the rotatable connection part 5 continues.

Figure 6:
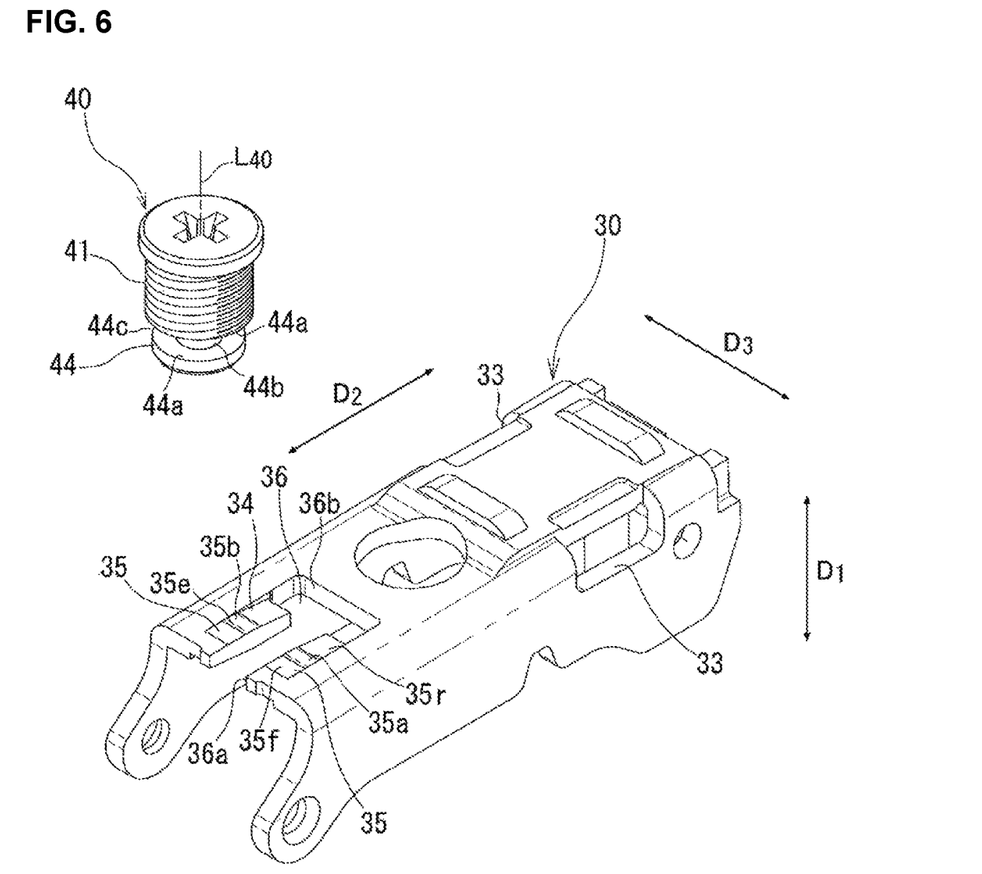
FIG. 6 shows an exploded perspective view of an adjustment screw and an intervention member of the hinge body.
Figure 7:
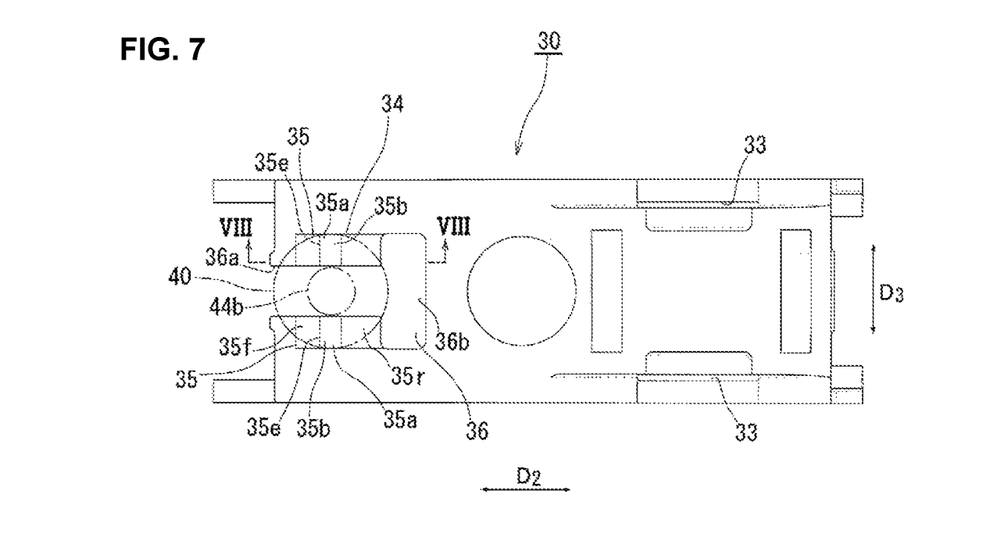
FIG. 7 shows a front view of the intervention member.

As shown in FIG. 2(b), the intervention member 30 is intervened between the body member 10 and the case body 1, i.e., the metal seat 3b. As shown in FIG. 5 and FIG. 6, the intervention member 30 is formed to the U-shaped cross-section while extending to the second direction $D_2$. As shown in FIG. 2(b), the intervention member 30 is installed detachably to the metal seat 3b. The body member 10 overlaps over the intervention member 30. As shown in FIG. 5(a) and FIG. 7, to a lateral side of a rear end of the intervention member 30 (right side in FIG. 7), an elongated hole 33 is formed. A longitudinal axis of the elongated hole 33 is directed to the longitudinal direction of the intervention member 30 (second direction $D_2$). As shown in FIG. 5(a), into the elongated hole 33, a pin-shaped connection axis 13 is inserted therethrough. An axis line $L_{13}$ of the connection axis 13 (connection axis line) is directed to a body member 10 and a width direction of the intervention member 30 (the third direction $D_3$ orthogonal to a sheet of FIG. 5(a)). Both ends of the connection axis 13 is positionally fixed to the body member 10. The intervention member 30 and the body member 10 are connected relatively and rotatably about the connection axis 13 as well as slidably relatively to each other to the second direction $D_2$.

As shown in FIG. 4 and FIG. 5(a), between the body member 10 and the intervention member 30, a second adjustment member 60 is disposed. By rotating the second adjustment member 60, the body member 10 is positionally adjustable against the intervention member 30 to the second direction $D_2$. Between the body member 10 and the second adjustment member 60, a rickety protection plate 65 is disposed. The rickety protection plate 65 is formed to roughly a rectangular plate shape and a press-fitting hole 65c is formed at the center region thereof. An operation axis part 61 of the second adjustment member 60 is press-fitted into the press-fitting hole 65c. Thereby, unintended rotation of the second adjustment member 60 may be protected.

As shown in FIG. 5, an adjustment screw 40 is placed at a position forwardly apart from the connection axis 13 in the first body part 4 along to the second direction $D_2$ (left direction in FIG. 5(a)). The adjustment screw 40 is screwed into the body member 10 (one member) and is locked to the intervention member 30 (another member). An axis of the adjustment screw 40 is directed to the first direction $D_1$ (front-and-back direction). By rotating the adjustment screw 40, the body member 10 is displaced rotationally about the connection axis 13 relatively to the intervention member 30. In other word, the body member 10 and the intervention member 30 are displaced to the direction orthogonal to the connection axis 13. Thereby, the forward end of the body member 10 (left end part in FIG. 2(a)) is positionally adjusted to the first direction $D_1$ relatively to the intervention member 30. Furthermore, the door 2 is positionally adjusted to the first direction $D_1$ relatively to the case body 1. Here, the metal seat 3b is incorporated with a position adjustment mechanism to the third direction $D_3$. As the result, the door 2 is adjustable positionally toward the first direction $D_1$, the second direction $D_2$ and the third direction $D_3$ relatively to the case body 1.

Details of the position adjustment mechanism to the first direction $D_1$ including the adjustment screw 40 is as follows:

As shown in FIG. 4, the body member 40 is formed with a first screw hole 14 therethrough. As shown in FIG. 5, a screw part 41 of the adjustment screw 40 is screwed into the first screw hole 14. As shown in FIG. 5 and FIG. 6, in a part at the forward side of the screw axis line $L_{40}$ from the screw part 41 of the adjustment screw 40 (lower side in FIG. 5), a locking part 44 is disposed. The locking part 44 includes an annular recess 44c, a neck part 44b, and a pair of sandwiching faces 44a. By forming the annular recess 44c at an outer peripheral part of the forward side part of the adjustment screw 40, the inward part thereof provides the neck part 44b. The neck part 44b is formed as a thinner columnar shape than the screw part 41. In addition, the pair of sandwiching faces 44a is disposed at both ends of the neck part 44b (both lateral sides of the annular recess 44c). The sandwiching faces 44a have planer shapes that are the annular shapes surrounding the neck part 44b and are orthogonal to the screw axis $L_{40}$ of the adjustment screw 40. The pair of the sandwiching faces 44a is each held opposite together along to the direction of the screw axis line $L_{40}$.

As shown in FIG. 6 and FIG. 7, a forward lateral side of the intervention member 30 (left side of FIG. 7) is disposed with a locked part 34 and a slit 36. The slit 36 comprises a vertical slit 36a and a lateral slit 36b being arranged to a T-shape when looked from the first direction $D_1$ orthogonal to the sheet of FIG. 7. The vertical slit 36a extends to the longitudinal direction of the intervention member 30 (second direction $D_2$) and reaches to the forward end edge of the intervention member 30 (left edge of FIG. 7). A width of the vertical slit 36a is generally equal to the diameter of the neck part 44b.

At both sides across the vertical slit 36a of the locked part 34, a pair of locked plate parts 35 is disposed. That is to say, the locked part 34 is divided into a pair of locked plate parts 35. These locked plate parts 35 are held apart oppositely each other along to the direction $D_3$ (direction parallel to the connection axis 13).

As shown in FIG. 5, into the vertical slit 36a between the pair of locking plate parts 35, the neck part 44b is inserted. In addition, the neck part 44b passes through the intervention member 30 (another member). Upon adjusting the position to the second direction $D_2$ by the second adjustment member 60, the neck part 44b is slid along to the vertical slit 36b.

By the pair of sandwiching faces 44a of the adjustment screw 40, the pair of locked plate parts 35 as well as the locked part 34 are sandwiched from the front-and-back side along to the first direction $D_1$.

Figure 8:
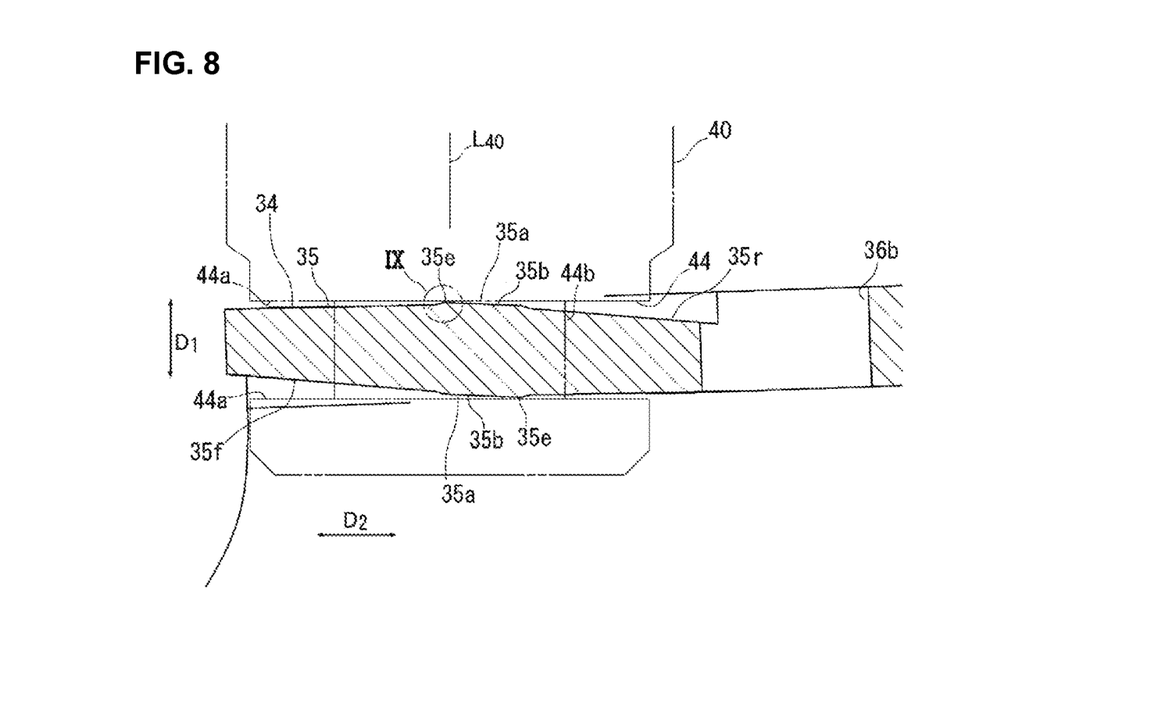
FIG. 8 shows a cross-sectional view of FIG. 7 along with a line VIII-VIII and an adjustment screw is shown by a two-dot chain line.

As shown in FIG. 7 and FIG. 8, each of the locked plate parts 35 comprises a ridge part 35a and lateral parts 35f, 35r. At both of front-and-back lateral faces at the center region along to the second direction $D_2$ of each locked plate part 35 (as well as the locked part 34), the ridge parts 35a is each formed. The ridge part 35a has a certain width and extends to the third direction $D_3$. A width of the ridge part 35a (size along to the second direction $D_2$) is smaller than the diameter of the neck part 44b. A length of the ridge part 35a (size along to the third direction $D_3$) is generally equal to a difference of inner and outer diameters of the sandwiching face 44a, or larger than that. A ridge top face 35b is formed to a planer shape. Each of the ridge top faces 35b at the front-and back sides becomes parallel each other.

As shown in FIG. 7 and FIG. 8, at both lateral sides of each locked plate part 35 (as well as locked part 34), a contact part 35e with a ridge shape is each formed. For details, an edge (edge of 1) at the forward side (left side in FIG. 8) of the ridge top face 35b at the front side (upper side in FIG. 8) provides the contact part 35e. Similarly, an edge (edge of 1) at the backward side (right side in FIG. 8) of the ridge top face 35b at the back side (lower side in FIG. 8) provides another contact part 35e. The ridge top face 35b continues along to the lateral side of each contact part 35e in the second direction $D_2$ (direction connecting the connection axis 13 and the adjustment screw 40). The contact part 35e forms a ridgeline shape and extends to the third direction $D_3$ parallel to the connection axis 13. The contact part 35e may not be acute and may be shaped as an R-shape.

As shown in FIG. 8, a spacing distance between the contact part 35e at the front side (upper side of FIG. 8) and the contact part 35e at the back side (lower side in FIG. 8) along to the first direction $D_1$ (up-and-down direction in FIG. 8) is generally equal to an axis length of the neck part 44b. In addition, the contact part 35a at the front side and the contact part 35e at the back side are apart along to the second direction $D_2$.

The contact part 35e at the front side (upper side in FIG. 8) abuts to a sandwiching face 44a of one side (upper side in FIG. 8) with facing thereto. The contact part 35e at the back side (lower side in FIG. 8) abuts to a sandwiching face 44a of another side (lower side in FIG. 8) with facing thereto. The contact between the contact part 35e and the sandwiching face 44a is almost a line contact.

As shown in FIG. 7 and FIG. 8, each of the ridge top faces 35b forms slope that inclines to the other contact part 35e when going far from the corresponding contact part 35e along to the second direction $D_2$ (direction connecting the connection axis 13 and the adjustment screw). Thereby, the ridge top face 35b avoids contact with the sandwiching face 44a each facing thereto.

A lateral part 35f extends forward along to the second direction $D_2$ (left direction in FIG. 8) beyond the ridge part 35a. A lateral part 35r extends backward along to the second direction $D_2$ (right direction in FIG. 8) beyond the ridge part 35a.

A thickness of the center region where the ridge part 35a is positioned in the locked plate part 35 is relatively large and thicknesses of the lateral parts 35f, 35r are relatively small. In addition, the thicknesses of the lateral parts 35f, 35r each become continuously small when going far from the ridge part 35a, i.e., the contact part 35e along to the second direction $D_2$. Thereby, both of the front-and-back lateral faces of the lateral part 35f, 35r (clearance parts) are allowed to avoid the contact with the sandwiching face 44a each facing thereto.

In the hinge device 3, because the pair of sandwiching faces 44a each abuts to the contact part 35e, the rickety movement of the body member 10, i.e., the door 2 to the first direction $D_1$ may be prevented.

Furthermore, since the contact part 35e has a linear shape, the sandwiching face 44a and the contact part 35e make the linear contact. Therefore, the load bearing property of the hinge device 3 may be enhanced when compared to the case of the point contact (Patent Literature 2). Furthermore, by making the center region contacting with the sandwiching face 44a of the locked plate part 35 thick, the load bearing property may be enhanced. In addition, by separating apart the contact part 35e at the front side and the contact part 35e at the back side along to the second direction $D_2$, the adjustment screw 40 may be locked to the intervention member 30 stably.

Upon positionally adjusting the door 2 to the first direction $D_1$, the adjustment screw 40 is adjusted angularly about a screw adjustment axis line $L_{40}$. At this time, the sandwiching face 44a slides on the contact part 35e. On the other hand, because the contact part 35e is linear, a contact area between the sandwiching face 44a and the contact part 35e can be reduced. Thereby, friction resistance between the adjustment screw 40 and the intervention member 30 can be lowered upon angularly adjusting the adjustment screw 40.

Figure 9:
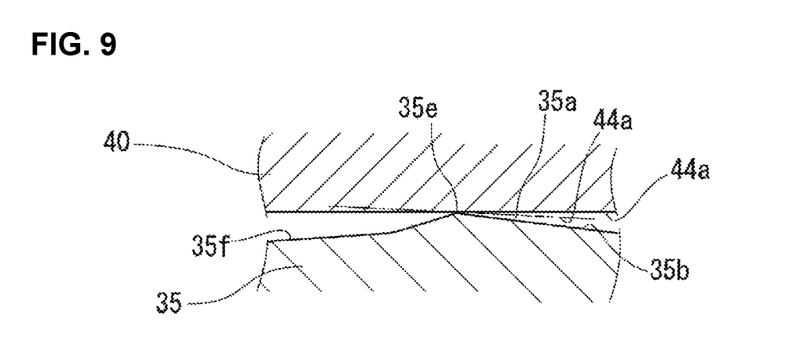
FIG. 9 shows an enlarged cross-sectional view illustrating a contact position between a contact part and a sandwiching part in a circle IX of FIG. 8.

As shown by two-dot chain line in FIG. 5, by angularly adjusting the adjustment screw 40, the body member 10 is displaced as to rotate relatively to the intervention member 30 about the connection line $L_{13}$. In response to this, the screw axis line $L_{40}$ of the adjustment screw 40 is displaced rotationally together with the body member 10. Accordingly, as shown in the two dot-chain line in FIG. 9, the sandwiching face 44a is displaced rotationally about the third direction $D_3$. On the other hand, by providing clearance parts 35b, 35r, 35f at the lateral side of the contact part 35e, interference of the sandwiching face 44a with the part other than the contact part 35e of the intervention member 30 may be avoided so that the adjustment screw 40 is displaced smoothly in its rotation and the operability upon adjusting the angle may be assured.

Next, another embodiment of the present invention will be explained. In the embodiment described hereunder, constructions overlapped with the embodiment that has been already explained are accompanied with the same signs and explanations will be omitted.

Figure 10:
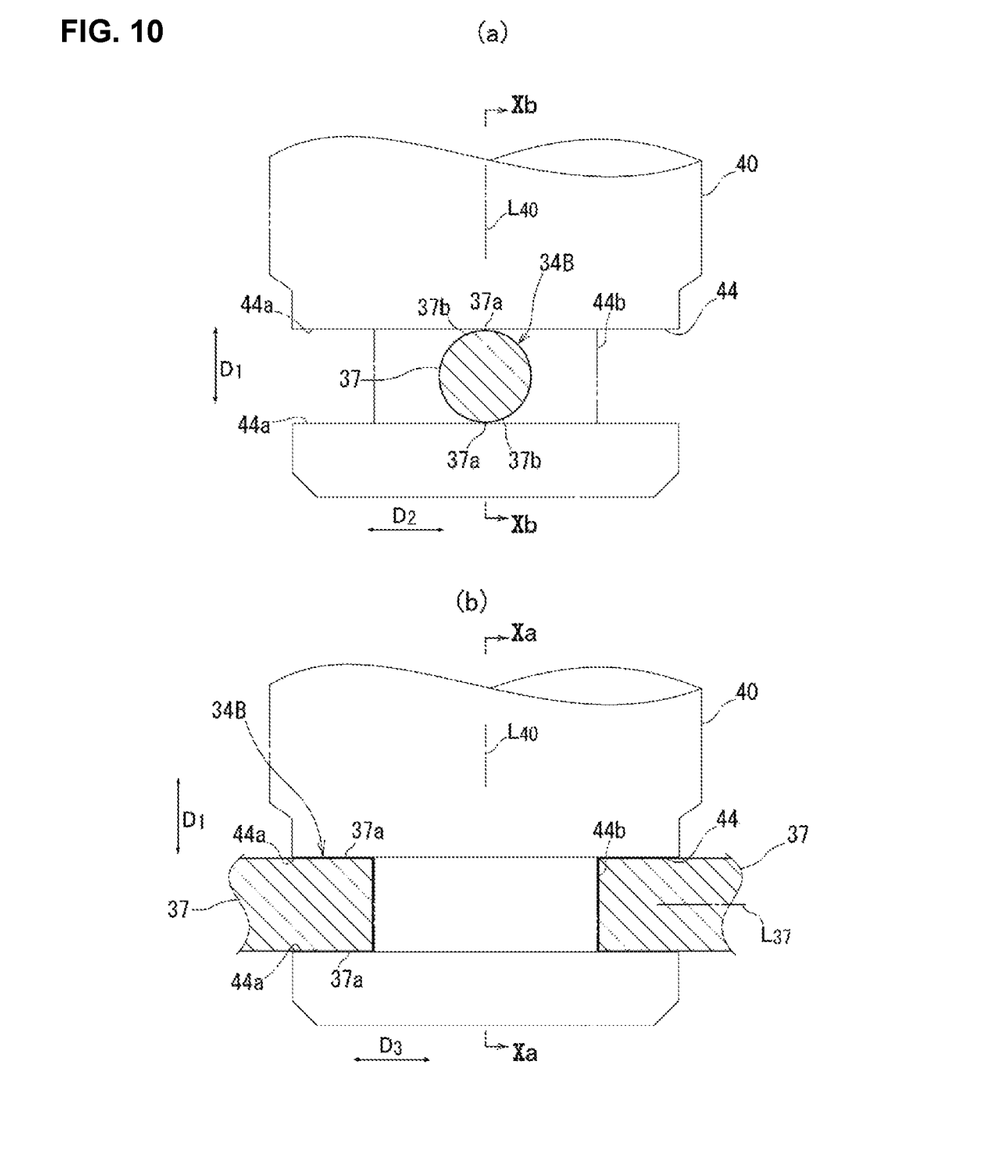

FIG. 10 shows a second embodiment of the present invention. The second embodiment relates to a modified example of the locked part. As shown in FIG. 10(b), the locked part 34B comprises a pair of columnar part 37. An axis line $L_{37}$ of the columnar part 37 is directed to the third direction $D_3$. In addition, the pair of columnar part 37 is held opposite each other along to the third direction $D_3$. As shown in FIG. 10(a), a diameter of the columnar part 37 substantially equals to the distance between the pair of sandwiching faces 44a of the adjustment screw 40.

The pair of columnar part 37 is each sandwiched between the pair of sandwiching faces 44a. An upper end and the lower end at a peripheral face of the columnar part 37 contact with each of the sandwiching faces 44a, thereby contact regions 37a being provided. The contact regions 37a are formed as a ridge shape extending parallel to the third direction $D_3$, i.e., the connection axis 13 (refer to FIG. 2(a)). Both lateral sides separated across the contact region 37a at the peripheral face of the columnar part 37 provide clearance parts 37b for avoiding the contact with the sandwiching face 44a.

The present invention is not limited to the above embodiments, and various modifications may be possible without departing from scope of the invention.

For example, the door 2 may configure the first member and the case body 1 may configure the second member. The first body part 4 including the body member 10 and the intervention member 30 may be disposed to the door 2 and the second body part 6 may be disposed to the case body 1.

The locked part may merely have the contact part and the clearance part each having the ridge shape, and the shape thereof is not limited to the plate shape or the columnar shape, and various shapes may be applied therefor such as an elliptical columnar shape.

The adjustment screw 40 may be screwed into the intervention member 30 (one member) and may be locked to the body member 10 (another member). The first screw member 14 may be formed to the intervention member 30, and the locked member 34 may be formed to the body member 10.

The connection mechanism between the first body part and the second body part through the rotatable connection part 5 is not limited to the four-joint link and may be a seven-joint link as well as one-axis hinge.

The connection axis 13 is not limited to the elongated pin shape and, for example, may be a pair of short rivet types. Lateral plates adjacent each other of the body member 10 having the U-shaped cross-section and the intervention member 30 having the U-shaped cross-section may be connected rotatably and relatively each other by a rivet shaped connection axis.

In the embodiments, the configuration that the first direction $D_1$ is defined to the front-and-back direction (or left-and-right direction), the second direction $D_2$ is defined to the forward-and-backward direction and the third direction $D_3$ is defined to the up-and-down direction is merely an example and the present invention should not be limited thereto.

INDUSTRIAL APPLICABILITY

The present invention can be applied to a hinge device and the like for connecting, for example, a case of furniture or a wall of building.

DESCRIPTION OF SIGNS $D_1$ left-and-right direction (first direction)
$D_2$ forward-and-backward direction (second direction)
$D_3$ up-and-down direction (third direction)
1 case body (first member)
2 door (second member)
3 hinge device
4 first body part
5 rotatable connection part
6 second body part
10 body member
13 connection axis
30 intervention member
34, 34B locked part
35 locked plate part
35a ridge part
35e contact part
35b ridge top face (clearance part)
35r lateral part at rearward side (clearance part)
35f lateral part at forward side (clearance part)
37 columnar part
37a contact part
37b clearance part
40 adjustment screw L40 screw axis line
44 lock part
44a sandwiching face
44b neck part

The invention claimed is:

1. A hinge device connecting rotatably a first body part at a first member side and a second body part at a second member side through a rotatable connection part, the first body part comprising:
   a body member continuous to the rotatable connection part;
   an intervention member intervened between the first member and the body member while connected rotatably about a connection axis relatively to the body member; and
   an adjustment screw relatively displacing the body member and the intervention member to a direction orthogonal to the connection axis by screwed into one member of the body member or the intervention member while locked to another member;
   wherein, the adjustment screw includes a neck part passing through another member and a pair of sandwiching faces disposed so as to face oppositely each other at both ends of the neck part; and wherein
   another member comprises a locked part sandwiched between the pair of sandwiching faces each other, to both lateral faces of the locked part, a contact part having a ridge shape contacted with a sandwiching face facing oppositely while each extending parallel to the connection axis and a clearance part avoiding contact with the facing sandwiching face while continuing to a lateral side of the contact part in a direction connecting the connection axis and the adjustment screw.

2. The hinge device of claim 1, wherein the clearance part forms an inclined face slanting toward another contact part side when going far from a corresponding contact part to a direction connecting the connection axis and the adjustment screw.

3. The hinge device of claim 2, wherein a ridge part is formed at both lateral face of the locked part and a ridge top face of the ridge part configures the inclined face and a first edge part of the ridge top face configures the contact part.

4. The hinge device of claim 3, wherein a thickness of the locked part decreases when going far from the contact part to a direction connecting the connection axis and the adjustment screw.

5. The hinge device of claim 3, wherein a contact part facing to one sandwiching face and a contact part facing to another sandwiching face are apart each other along to a direction connecting the connection axis and the adjustment screw.

6. The hinge device of claim 3, wherein the locked part comprises a pair of locked plate parts that face opposite with spacing along to a direction parallel to the connection axis and the neck part is passed therebetween, and the contact part and the clearance part are formed at both lateral faces of each locked plate part.

7. The hinge device of claim 3, wherein the sandwiching face has a planer shape orthogonal to a screw axis line of the adjustment screw.

8. The hinge device of claim 1, wherein a thickness of the locked part decreases when going far from the contact part to a direction connecting the connection axis and the adjustment screw.

9. The hinge device of claim 8, wherein a contact part facing to one sandwiching face and a contact part facing to another sandwiching face are apart each other along to a direction connecting the connection axis and the adjustment screw.

10. The hinge device of claim 8, wherein the locked part comprises a pair of locked plate part that faces opposite with spacing along to a direction parallel to the connection axis and the neck part is passed therebetween, and the contact part and the clearance part are formed at both lateral faces of each locked plate part.

11. The hinge device of claim 8, wherein the sandwiching face has a planer shape orthogonal to a screw axis line of the adjustment screw.

12. The hinge device of claim 1, wherein a contact part facing to one sandwiching face and a contact part facing to another sandwiching face are apart each other along to a direction connecting the connection axis and the adjustment screw.

13. The hinge device of claim 1, wherein the locked part comprises a pair of locked plate part that faces opposite with spacing along to a direction parallel to the connection axis and the neck part is passed therebetween, and the contact part and the clearance part are formed at both lateral faces of each locked plate part.

14. The hinge device of claim 1, wherein the sandwiching face has a planer shape orthogonal to a screw axis line of the adjustment screw.

* * * * *